United States Patent
Tada et al.

(10) Patent No.: US 9,818,517 B2
(45) Date of Patent: Nov. 14, 2017

(54) HEXAGONAL FERRITE MAGNETIC PARTICLES, MAGNETIC RECORDING POWDER, AND MAGNETIC RECORDING MEDIUM

(71) Applicant: FUJIFILM Corporation, Minato-ku, Tokyo (JP)

(72) Inventors: Toshio Tada, Minami-ashigara (JP); Hiroyuki Suzuki, Minami-ashigara (JP); Osamu Shimizu, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/224,726

(22) Filed: Mar. 25, 2014

(65) Prior Publication Data

US 2014/0295214 A1    Oct. 2, 2014

(30) Foreign Application Priority Data

Mar. 26, 2013 (JP) ................. 2013-064932

(51) Int. Cl.
*G11B 5/708* (2006.01)
*H01F 1/11* (2006.01)
*G11B 5/706* (2006.01)

(52) U.S. Cl.
CPC ............ *H01F 1/11* (2013.01); *G11B 5/70615* (2013.01); *G11B 5/70678* (2013.01)

(58) Field of Classification Search
CPC .... G11B 5/70615; G11B 5/70678; H01F 1/11
See application file for complete search history.

(56) References Cited

U.S. PATENT DOCUMENTS

| 6,777,073 B2 | 8/2004 | Nakamikawa et al. |
| 2003/0143432 A1 | 7/2003 | Nakamikawa et al. |
| 2003/0190495 A1* | 10/2003 | Masaki et al. ......... 428/694 BH |
| 2010/0021771 A1 | 1/2010 | Yamazaki et al. |
| 2012/0177951 A1* | 7/2012 | Yamazaki et al. ......... 428/842.8 |
| 2012/0251844 A1 | 10/2012 | Yamazaki et al. |

FOREIGN PATENT DOCUMENTS

| JP | 2003-296917 A | | 10/2003 |
| JP | 2007305197 A | * | 11/2007 |
| JP | 2010-024113 A | | 2/2010 |
| JP | 2010-282685 A | | 12/2010 |
| JP | 2012-142529 A | | 7/2012 |
| JP | 2012-204726 A | | 10/2012 |

OTHER PUBLICATIONS del Muro et al. The effect of magnetic interaction in barium hexaferrite particles, J. Appl. Phys. 81 (8), 1997, 3812-3814.*
English Machine Translation: Harasawa et al. (JP2007-305197).*
Office Action dated Mar. 3, 2015, issued by the Japan Patent Office in corresponding Japanese Application No. 2013-064932.

* cited by examiner

*Primary Examiner* — Holly Rickman
*Assistant Examiner* — Linda Chau
(74) *Attorney, Agent, or Firm* — Sughrue Mion, PLLC

(57) ABSTRACT

Hexagonal ferrite magnetic particles have an activation volume ranging from 1,000 $nm^3$ to 1,500 $nm^3$, and $\Delta E_{10\%}/kT$, thermal stability at 10% magnetization reversal, is equal to or greater than 40.

10 Claims, No Drawings

HEXAGONAL FERRITE MAGNETIC PARTICLES, MAGNETIC RECORDING POWDER, AND MAGNETIC RECORDING MEDIUM

CROSS-REFERENCE TO RELATED APPLICATIONS

This application claims the benefit of priority under 35 USC 119 to Japanese Patent Application No. 2013-064932 filed on Mar. 26, 2013, which is expressly incorporated herein by reference in its entirety.

BACKGROUND OF THE INVENTION

Field of the Invention

The present invention relates to hexagonal ferrite magnetic particles and to a method of manufacturing the same. More particularly, the present invention relates to hexagonal ferrite magnetic particles that are suitable for use as ferromagnetic material in a magnetic recording medium for high-density recording, and to a method of manufacturing the same.

The present invention further relates to magnetic recording powder comprised of the above hexagonal ferrite magnetic particles, and to a magnetic recording medium comprising the above hexagonal ferrite magnetic particles.

Discussion of the Background

Conventionally, ferromagnetic metal magnetic particles have primarily been employed in the magnetic layers of magnetic recording media for high-density recording. Ferromagnetic metal magnetic particles are primarily acicular particles consisting mainly of iron. To achieve high-density recording, efforts have been made to reduce the size of the particles and increase their coercive force. They have been employed in magnetic recording media used in various applications.

With the increase in the amount of information being recorded, ever higher density recording has been demanded of magnetic recording media. However, in achieving even higher density recording, limits to the improvement of ferromagnetic metal magnetic particles have begun to appear. By contrast, magnetic recording media with magnetic layers in which hexagonal ferrite magnetic particles are employed have better high-density characteristics in their vertical components. Accordingly, hexagonal ferrite magnetic particles are ferromagnetic material that is suited to achieving even higher densities. Thus, in recent years, various investigation has been conducted into magnetic recording media employing hexagonal ferrite magnetic particles (for example, Japanese Unexamined Patent Publication (KOKAI) No. 2012-204726 or English language family member US2012/251844A1; Japanese Unexamined Patent Publication (KOKAI) No. 2012-142529 or English language family member US2012/177951A1; Japanese Unexamined Patent Publication (KOKAI) No. 2010-282685; and Japanese Unexamined Patent Publication (KOKAI) No. 2003-296917 or English language family members US2003/143432A1 and U.S. Pat. No. 6,777,073, which are expressly incorporated herein by reference in their entirety).

SUMMARY OF THE INVENTION

In recent years, ever higher density recording has been achieved. Recording densities in the form of surface recording densities of 1 Gbpsi and above, even 10 Gbpsi and above, have been targeted. To achieve such high-density recording, the use of hexagonal ferrite magnetic particles of even smaller size has been required to reduce noise.

However, when the particle size of a hexagonal ferrite magnetic particle is reduced, the energy (magnetic energy) that can be maintained by the magnetic particles in the direction of magnetization tends to be difficult to overcome thermal energy, and recording retention may end up diminishing due to thermal fluctuation. The phenomenon whereby magnetic energy is overcome by thermal energy and recording is lost cannot be ignored. In this regard, conventional techniques including the above publications have come to employ "KuV/kT" as an indicator of the thermal stability of magnetization. Ku is the anisotropic constant of magnetic material. V is the particle volume (activation volume); k is the Boltsmann constant; and T is absolute temperature. In conventional techniques, attempts have been made to raise "KuV/kT" by adjusting the composition of hexagonal ferrite and the like. However, achieving both a reduction in the particle size of the magnetic material and thermal stability remains a problem that should be resolved in the field of magnetic recording.

An aspect of the present invention provides for fine particulate hexagonal ferrite magnetic particles with high thermal stability.

"KuV/kT," which has conventionally been considered an indicator of thermal stability, is a value obtained from the time dependence of the coercive force Hc. It can be measured by the method disclosed in Examples further below. The coercive force, Hc, is the point of intersection with the X-axis when the amount of magnetization is plotted (in a hysteresis curve) against the magnetic field applied. That is, it is the value of the magnetic field where the amount of magnetization goes to zero. The phrase "zero magnetization" means that 50% of the total amount of magnetization of the sample reverses magnetization. That is, "KuV/kT" is an indicator of thermal stability in a region in which 50% of the total magnetization of a sample that has been subjected to saturation magnetization has been reversed. In this context, the Ku, V, k, and T in "KuV/kT" are defined as above. When the particle size of the magnetic material is reduced to increase the density of magnetic recording, the particle volume (activation volume) V decreases, thereby reducing "KuV/kT," and thermal stability is known to decrease.

The present inventors conducted extensive research in this regard. As a result, they made the new discovery, previously unknown, that when the thermal stability "$\Delta E_{10\%}/kT$", calculated from the reverse magnetic field Hrd (10%) required to produce a magnetization reversal of 10% of the total amount of magnetization, was equal to or greater than 40, even though the value of "KuV/kT" did not necessarily increase, signal decay could decrease and a magnetic recording medium with good thermal stability could be obtained.

The present inventors conducted further extensive research based on this new knowledge. As a result, they discovered that in a hexagonal ferrite magnetic particle in which the thermal stability $\Delta E_{10\%}/kT$ was equal to or greater than 40 when 10% of the total amount of magnetization underwent a reversal in magnetization, and in which the activation volume was 1,000 $nm^3$ to 1,500 $nm^3$, even a fine particle such as set forth above could exhibit high thermal stability. The present invention was devised on that basis.

An aspect of the present invention relates to:

hexagonal ferrite magnetic particles, which have:

an activation volume ranging from 1,000 $nm^3$ to 1,500 $nm^3$, and $\Delta E_{10\%}/kT$, thermal stability at 10% magnetization reversal, is equal to or greater than 40.

In an embodiment, the above hexagonal ferrite magnetic particles have a coercive force ranging from 175 kA/m to 400 kA/m.

In an embodiment, the above hexagonal ferrite magnetic particles exhibit a switching field distribution, SFD, ranging from 0.2 to 0.8.

In an embodiment, the above hexagonal ferrite magnetic particles comprise 1.5 atomic percent to 20 atomic percent of Al relative to Fe.

A further aspect of the present invention relates to magnetic recording powder, which comprised of the above hexagonal ferrite magnetic particles.

A further aspect of the present invention relates to a magnetic recording medium comprising a magnetic layer comprising ferromagnetic material and binder on a nonmagnetic support, wherein the ferromagnetic material comprises the above hexagonal ferrite magnetic particles.

A further aspect of the present invention relates to a method of manufacturing the above hexagonal ferrite magnetic particles, which comprises:

preparing the above hexagonal ferrite magnetic particle by a glass crystallization method with the use of a starting material mixture comprising a glass-forming component and a hexagonal ferrite-forming component.

In an embodiment, the starting material mixture comprises 30 mole percent to 50 mole percent of BaO component per 100 mole percent of the total quantity of the starting material mixture.

In an embodiment, the starting material mixture comprises 20 mole percent to 50 mole percent of $Fe_2O_3$ component per 100 mole percent of the total quantity of the starting material mixture.

In an embodiment, the starting material mixture comprises 1 mole percent to 15 mole percent of $Al_2O_3$ component per 100 mole percent of the total quantity of the starting material mixture.

In an embodiment, the glass crystallization method is conducted by:

melting the starting material mixture in a melting tank;

discharging the melt through an outlet provided in the bottom of the melting tank and feeding the melt between a pair of pressure rolls that rotate and are positioned beneath the melting tank;

discharging the amorphous material from between the rolls by extending by applying pressure and cooling the melt that is supplied between the pressure rolls;

heat treating the amorphous material to cause hexagonal ferrite magnetic particles to precipitate; and collecting the hexagonal ferrite magnetic particles that have precipitated from the material obtained by the heat treatment;

where the discharge of the melt from the outlet is conducted in the form of a continuous flow of melt at a flow rate of 1 g/s to 5 g/s.

In an embodiment, the discharge of the melt from the outlet is conducted by applying pressure within the melting tank while stirring the melt.

An aspect of the present invention can provide a magnetic recording medium having both thermal stability and good electromagnetic characteristics in the high-density recording region.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

An aspect of the present invention relates to hexagonal ferrite magnetic particles, which have an activation volume ranging from 1,000 $nm^3$ to 1,500 $nm^3$, and $\Delta E_{10\%}/kT$, thermal stability at 10% magnetization reversal, is equal to or greater than 40.

The hexagonal ferrite magnetic particles of an aspect of the present invention will be described in greater detail below.

As stated above, "KuV/kT," conventionally considered to be an indicator of thermal stability, indicates thermal stability at 50% reversal of magnetization. By contrast, the above $\Delta E_{10\%}$ is a value in the region where 10% of the total amount of magnetization has reversed, as set forth above. The larger the above value, the fewer those particles of low thermal stability (tending to undergo thermal fluctuation) there are, that is, the sharper the distribution. As $\Delta E_{10\%}/kT$ reaches or exceeds 40 and the distribution sharpens, thermal fluctuation can decrease, signal decay can decrease, and the magnetic particles can obtain for use in a magnetic recording medium exhibiting extremely good thermal stability. $\Delta E_{10\%}/kT$ is desirably equal to or greater than 45 to achieve even better thermal stability. The upper limit of $\Delta E_{10\%}/kT$ is, for example, equal to or less than 100. However, the higher the above value, the better the thermal stability becomes. Thus, such an upper limit is not a specific limitation.

In the present invention, $\Delta E_{10\%}/kT$ is a value that is measured by the method set forth below. Means of controlling $\Delta E_{10\%}/kT$ will be described further below.

In the evaluation of magnetic characteristics, the value of the reverse magnetic field when a weak magnetic field is applied in the opposite direction from the direction in which magnetization has been saturated, and the amount of residual magnetization when the magnetic field has been removed reaches 80% of the saturation magnetization level (that is, 10% of the particles undergo a reversal in magnetization) is defined as the Hrd (10%). Using the Hrd (10%) value when this reverse magnetic field is applied and the retention time is changed from 1, 10 and 100 seconds, $\Delta E_{10\%}/kT$ is calculated from the following equation.

$$Hrd(10\%)=H0[1-\{(kT/\Delta E_{10}\%)\ln(f0t/\ln 2)\}0.77]$$

In the equation, Hrd (10%): residual coercive force at 10% magnetization reversal; H0: residual coercive force on order of 10-9 seconds; 10: spin precession frequency; and t: reverse magnetic field retention time.

The hexagonal ferrite magnetic particles of an aspect of the present invention has an activation volume falling within a range of 1,000 nm³ to 1,500 nm³ in addition to a $\Delta E_{10\%}/kT$ falling within the above-stated range. By having an activation volume falling within a range of 1,000 nm³ to 1,500 nm³, it is possible to reduce noise in the high-density recording region and achieve a high signal-to-noise-ratio (SNR). By contrast, when the activation volume exceeds 1,500 nm³, it becomes difficult to reproduce with high sensitivity a signal that has been recorded at high density, and the SNR drops. Additionally, hexagonal ferrite magnetic particles with an activation volume of less than 1,000 nm³ are difficult to produce, and even when they can be produced, do not readily achieve a $\Delta E_{10\%}/kT$ falling within the above range. Accordingly, as stated above, the activation volume is set to within a range of 1,000 nm³ to 1,500 nm³. From the perspective of further enhancing the SNR, the activation volume desirably falls within a range of 1,000 nm³ to 1,300 nm³. The activation volume can be measured by the method disclosed in Examples further below.

The activation volume of hexagonal ferrite magnetic particles can be controlled by means of the magnetic particle manufacturing conditions. For example, when manufacturing is conducted by the glass crystallization method, the activation volume of the magnetic particles can be controlled by the crystallization conditions (crystallization temperature and period during which they are maintained at that temperature).

In terms of the magnetic characteristics of the hexagonal ferrite magnetic particles of an aspect of the present invention, from the perspective of achieving an even higher SNR, the coercive force Hc desirably falls within a range of 175 kA/m to 400 kA/m, preferably within a range of 175 kA/m to 360 kA/m., and more preferably, within a range of 190 kA/m to 280 kA/m. From the perspective of reducing noise, a low switching field distribution (SFD), which indicates the coercive force distribution, is desirable, such as one falling within a range of 0.2 to 0.8. Unless specifically stated otherwise, in the present invention, magnetic characteristics such as the He and SFD are values measured at 23° C.

The He and SFD, as set forth above, can be controlled by means of the starting material composition of the hexagonal ferrite, the manufacturing conditions (such as the glass crystallization method and crystallization conditions), and the like.

In the hexagonal ferrite magnetic particles of an aspect of the present invention, fine particulate magnetic material having an activation volume falling within the above-stated range can contribute to achieving a high SNR in the high-density recording region. The above-stated thermal stability can contribute to achieving highly reliable magnetic recording without or with little signal decay. Accordingly, the hexagonal ferrite magnetic particles of an aspect of the present invention are suitable as the magnetic recording powder (magnetic recording-use magnetic powder) in various magnetic recording medium, such as backup tapes, that are required to permit use for extended periods with high reliability. That is, an aspect of the present invention relates to magnetic recording powder comprised of the hexagonal ferrite magnetic particles of an aspect of the present invention. Details of embodiments in which the hexagonal ferrite magnetic particle of an aspect of the present invention are employed as magnetic recording powder will be given further below.

So long as the hexagonal ferrite magnetic particles of an aspect of the present invention have the characteristics set forth above, the method used to manufacture them is not specifically limited. A known method of manufacturing hexagonal ferrite magnetic particles, such as the glass crystallization method, hydrothermal synthesis method, or coprecipitation method, can be used as the method of manufacturing the hexagonal ferrite magnetic particles of an aspect of the present invention. From the perspective of the ease of manufacturing fine particulate magnetic particles having an activation volume falling within the range set forth above, the glass crystallization method is desirable.

The glass crystallization method generally comprises the following steps:

(1) a step of melting a starting material mixture containing a hexagonal ferrite-forming component (including an optional coercive force-adjusting component) and a glass-forming component to obtain a melt (melting step);

(2) a step of quenching the melt to obtain an amorphous material (amorphous material rendering step);

(3) a step of subjecting the amorphous material to a heat treatment to precipitate hexagonal ferrite particles (crystallization step); and (4) a step of collecting the hexagonal ferrite magnetic particles that have precipitated from the heat-treated product (particle collecting step).

The present inventors conducted extensive research. As a result, they discovered that it was effective to obtain a highly homogeneous amorphous material in step (2) to obtain hexagonal ferrite magnetic particles with a high $\Delta E_{10\%}/kT$ by the glass crystallization method. The fact that the generation of components that reduce the $\Delta E_{10\%}/kT$ could be inhibited by crystallizing the homogeneous amorphous material was thought to contribute to enhancing $\Delta E_{10\%}/kT$. Thus, the use of a readily vitrifying composition as the starting material mixture is one effective method. Since a starting material mixture with a readily vitrifying composition tends not to generate crystals during quenching, it is possible to obtain an amorphous material of high homogeneity. Raising the quenching efficiency in step (2) is also an effective means of obtaining a homogeneous amorphous material. Accordingly, when obtaining the hexagonal ferrite magnetic particles of an aspect of the present invention by the glass crystallization method, the above means are optionally and desirably combined.

The above means will be described in greater detail below.

As set forth above, the starting material mixture employed in the glass crystallization method comprises a hexagonal ferrite-forming component (including an optional coercive force-adjusting component) and a glass-forming component. In this context, the term "glass-forming component" is used to mean a component that is capable of exhibiting a vitreous transition to become amorphous (vitrification). A $B_2O_3$ component is used in the usual glass crystallization method. A starting material mixture containing a $B_2O_3$ component as a glass-forming component can be employed in the present invention, as well. In the glass crystallization method, the various components that are contained in the starting material mixture are present as oxides, or as various salts that can change into oxides in the melting step or the like. In the present invention, the term "$B_2O_3$ component" includes $B_2O_3$ itself, as well as various salts such as $H_3BO_3$ that become $B_2O_3$ during processing. The same applies to the other components. The composition of the starting material mixture that is described further below is a composition that is based on conversion to oxides. Examples of glass-forming components in addition to the $B_2O_3$ component are an $SiO_2$ component, $P_2O_5$ component, and $GeO_2$ component. It is also possible to employ an $Al_2O_3$ component.

Examples of hexagonal ferrite-forming components that are contained in the starting material mixture are metal oxides such as $Fe_2O_3$, BaO, SrO, and PbO, which are the constituent components of hexagonal ferrite magnetic particles. For example, the use of a BaO component as a principal component among the hexagonal ferrite-forming components makes it possible to obtain barium ferrite magnetic particles.

It is also possible to obtain hexagonal ferrite magnetic powder in which a portion of the Fe is substituted with other metal elements to adjust the coercive force. Examples of the substitution elements are Co—Zn—Nb, Zn—Nb, Co, Zn, Nb, Co—Ti, Co—Ti—Sn, Co—Sn—Nb, Co—Zn—Sn—Nb, Co—Zn—Zr—Nb, Co—Zn—Mn—Nb. To obtain such hexagonal ferrite magnetic powder, it suffices to employ components for adjusting the coercive force in combination as hexagonal ferrite-forming components. Examples of coercive force-adjusting components are divalent metal oxide components such as CoO and ZnO; tetravalent metal oxide components such as $TiO_2$, $ZrO_2$, $SnO_2$, and $MnO_2$; and pentavalent metal oxide components such as $Nb_2O_5$. When employing these coercive force-adjusting components, it suffices to suitably determine the content thereof in conjunction with the desired coercive force.

The calorific value (also referred to as the "DSC calorific value", hereinafter) obtained by differential scanning calorimetry (DSC) can be employed as an indicator of a readily vitrifying composition. The lower the calorific value, the smaller the quantity of crystals generated, that is, the greater the tendency to vitrify (become amorphous).

One method of obtaining a starting material mixture with a low DSC calorific value, for example, is to control the concentration of the hexagonal ferrite-forming components in the starting material mixture. The use of a composition containing 20 mole percent to 50 mole percent of $Fe_2O_3$ component (in which a portion of the $Fe_2O_3$ component can be replaced with the above coercive force-adjusting components) per 100 mole percent of the total quantity of the starting material mixture is desirable for obtaining a starting material mixture with a low DSC calorific value, and the use of a composition containing 25 mole percent to 45 mole percent of $Fe_2O_3$ component is preferred.

An example of another means of obtaining a starting material mixture with a low DSC calorific value is to add a glass-forming component to the starting material mixture in the form of an $Al_2O_3$ component and/or an $SiO_2$ component. The content of the $Al_2O_3$ component desirably falls within a range of 1 mole percent to 15 mole percent, preferably within a range of 1 mole percent to 10 mole percent, and more preferably, within a range of 1.5 mole percent to 8.5 mole percent, per 100 mole percent of the total quantity of the starting material mixture. The hexagonal ferrite magnetic particles that are obtained can contain 1.5 atomic percent to 20 atomic percent of Al relative to Fe. The content of the $SiO_2$ component desirably falls within a range of 1 mole percent to 10 mole percent per 100 mole percent of the total quantity of starting material mixture. As yet another means, the BaO component that is employed when manufacturing barium ferrite, for example, is incorporated in relatively large quantity into the starting material mixture. The content of the BaO component desirably falls within a range of 30 mole percent to 50 mole percent, preferably within a range of 35.5 mole percent to 50 mole percent, and more preferably, within a range of 35.5 mole percent to 45 mole percent, per 100 mole percent of the total quantity of the starting material mixture. The same applies to the SrO component when obtaining strontium ferrite and the PbO component when obtaining lead ferrite.

Fine particulate hexagonal ferrite magnetic particles of high thermal stability can be obtained without actively introducing expensive rare earth elements in an aspect of the present invention. The content of rare earth elements desirably falls within a range of 0 atomic percent to 0.1 atomic percent relative to Fe in the hexagonal ferrite magnetic particles that are finally prepared.

A means of increasing the quenching efficiency in the amorphous rendering step will be described next.

The steps that are normally included in the glass crystallization method are as set forth above. More specifically, the starting material mixture is melted in a melting tank, the melt is discharged through an outlet provided in the bottom of the melting tank, the melt is fed between a pair of rotating pressure rolls positioned beneath the melt tank, and the melt that is fed is extended by applying pressure and cooled between the pressure rolls to discharge an amorphous material from between the rolls. The amorphous material thus obtained is subjected to a heat treatment to cause hexagonal ferrite magnetic particles to precipitate, and the hexagonal ferrite magnetic particles that precipitate from the material obtained by means of the heat treatment are collected to obtain hexagonal ferrite magnetic particles by the glass crystallization method. Here, by causing a small quantity of the melt to continuously flow out, it is possible to reduce the heat load on the pressure rolls, achieve a thinner strip of amorphous material, and the like. Thus, the cooling efficiency in the amorphous rendering step can be enhanced. It is desirable for the discharge of the melt from the outlet to be conducted continuously at a flow rate of 1 g/s to 5 g/s. The starting material mixture with the readily vitrifying composition set forth above will generally be highly viscous, so there will be cases where achieving a continuous, small outflow will be difficult. In such cases, it is desirable to apply pressure within the melting tank while stirring the melt to generate an outflow.

Additionally, for example, reference can be made to Japanese Unexamined Patent Publication (KOKAI) No. 2012-204726, paragraphs 0013 to 0031, Japanese Unexamined Patent Publication (KOKAI) No. 2012-142529, paragraphs 0012 to 0030, Japanese Unexamined Patent Publication (KOKAI) No. 2011-2135443, paragraphs 0013 to 0035, and Japanese Unexamined Patent Publication (KOKAI) No. 2011-225417, paragraphs 0012 to 0026, and to Examples in the above publications, for details regarding the glass crystallization method. The contents of the above publications are expressly incorporated herein by reference in their entirety.

As set forth above, an aspect of the present invention relates to a method of manufacturing the hexagonal ferrite magnetic particles of an aspect of the present invention by a glass crystallization method with the use of a starting material mixture containing a glass-forming component and a hexagonal ferrite-forming component. The details are as set forth above.

A further aspect of the present invention relates to a magnetic recording medium comprising a magnetic layer comprising ferromagnetic material and binder on a nonmagnetic support, wherein the hexagonal ferrite magnetic particles of an aspect of the present invention are contained as the ferromagnetic material.

The hexagonal ferrite magnetic particles of an aspect of the present invention are fine particulate magnetic particles having an activation volume falling within the above-stated range. Thus, they can contribute to a reduction of noise in the high-density recording region. Thus, the magnetic recording medium of an aspect of the present invention can exhibit good electromagnetic characteristics (a high SNR) in the high-density recording region. In addition, the hexagonal ferrite magnetic particles of an aspect of the present invention have good thermal stability while being fine particles. Thus, the magnetic recording medium of an aspect of the present invention can achieve highly reliable recording and reproduction without or with little signal decay due to thermal fluctuation.

The magnetic recording medium of an aspect of the present invention will be described below in greater detail.

(Magnetic Layer)

Details of the hexagonal ferrite magnetic particles that are contained in the magnetic layer and the method of manufacturing them are as set forth above. The magnetic recording layer contains binder in addition to the hexagonal ferrite magnetic particles of an aspect of the present invention. It can also contain additives as needed in addition to the above components. For details regarding binders and additives that can be employed in the magnetic layer, for example, reference can be made to Japanese Unexamined Patent Publication (KOKAI) No. 2012-204726, paragraphs 0032 and 0033.

(Nonmagnetic Layer)

Detailed contents relating to the nonmagnetic layer will be described next. In the magnetic recording medium of an aspect of the present invention, a nonmagnetic layer containing nonmagnetic powder and binder can be present between the nonmagnetic support and the magnetic layer. For details regarding the nonmagnetic layer, reference can be made to Japanese Unexamined Patent Publication (KOKAI) No. 2012-204726, paragraphs 0034 and 0035.

(Layer Structure)

In the thickness structure of the magnetic recording medium of an aspect of the present invention, the thickness of the nonmagnetic support is desirably 3 μm to 80 μm. The thickness of the magnetic layer can be optimized based on the saturation magnetization and head gap length of the magnetic head employed, and the bandwidth of the recording signal. Generally, it is 0.01 μm to 0.15 μm, desirably 0.02 μm to 0.12 μm, and preferably, 0.03 μm to 0.10 μm. It suffices for there to be at least one magnetic layer. The magnetic layer can be separated into two or more layers having differing magnetic characteristics. Known multilayer magnetic layer configurations can be applied.

The thickness of the nonmagnetic layer is, for example, 0.1 μm to 3.0 μm, desirably 0.3 μm to 2.0 μm, and preferably, 0.5 μm to 1.5 μm. The nonmagnetic layer in the magnetic recording medium of an aspect of the present invention will be able to achieve its effect so long as it is substantially nonmagnetic. For example, the effect of an aspect of the present invention will be achieved even if impurities or unintentional trace amounts of magnetic material are contained in the nonmagnetic layer, and the configuration can be deemed to be substantially identical to that of the magnetic recording medium of an aspect of the present invention. The term "substantially identical" means that the residual magnetic flux density of the nonmagnetic layer is equal to or less than 10 mT, or the coercive force is equal to or less than 7.96 kA/m (100 Oe), desirably meaning that no residual magnetic flux density or coercive force is present.

Reference can be made to Japanese Unexamined Patent Publication (KOKAI) No. 2012-204726, paragraph 0036, with regard to the nonmagnetic support in the magnetic recording medium of an aspect of the present invention. A backcoat layer can be provided on the opposite surface of the nonmagnetic support from the surface on which the magnetic layer is provided. Reference can be made to Japanese Unexamined Patent Publication (KOKAI) No. 2012-204726, paragraph 0039, for details thereof.

It suffices for the magnetic recording medium of an aspect of the present invention to contain the hexagonal ferrite magnetic particles of an aspect of the present invention in the magnetic layer; the manufacturing method is not specifically limited. The common methods of manufacturing particulate magnetic recording media can be applied as the method of manufacturing the magnetic recording medium of an aspect of the present invention. For example, reference can be made to Japanese Unexamined Patent Publication (KOKAI) No. 2012-204726, paragraph 0040, for details regarding the manufacturing method.

By containing the hexagonal ferrite magnetic particles of an aspect of the present invention, the magnetic recording medium of an aspect of the present invention as set forth above can achieve good electromagnetic characteristics in the high-density recording region while reducing signal decay due to thermal fluctuation.

EXAMPLES

The present invention will be described in detail below based on Examples. However, the present invention is not limited to Examples. The terms "parts" and "percent" given in Examples are weight parts and weight percent unless specifically stated otherwise.

1. Preparation of Hexagonal Ferrite Magnetic Particles

Prescribed quantities of $H_3BO_3$ corresponding to $B_2O_3$, $Al(OH)_3$ corresponding to $Al_2O_3$, $BaCO_3$ corresponding to BaO, $Fe_2O_3$, $Nb_2O_5$ corresponding to element Nb substituting Fe, and $Ta_2O_5$ corresponding to Ta were weighed out so as to yield the starting material composition shown in Table 1 based on oxides. The components were mixed in a mixer and the mixture was charged to a two-liter platinum crucible and melted. The melt was caused to flow out continuously at the rate indicated in Table 2 onto water-cooled rolls and cooled by the water-cooled rolls to obtain an amorphous material. The flow rate was adjusted in response to the glass viscosity by means of the nozzle diameter and by applying pressure.

A 600 g quantity of the amorphous material obtained was charged to an electric furnace, the temperature was raised over three hours to the crystallization temperature indicated in Table 2, and the material was maintained at that temperature for five hours to crystallize hexagonal ferrite. The crystallized product containing the hexagonal ferrite was coarsely crushed with a mortar and pestle, charged to a three-liter pot mill, and pulverized for 4 hours in a ball mill along with 5 kg of ϕ 5 mm $ZrO_2$ balls and 1.2 kg of pure water. The pulverized solution was then separated from the balls and placed in a five-liter stainless steel beaker. The pulverized solution was reacted for 2 hours at 85° C. in an 8 percent acetic acid solution, cleaned by repeated decantation to remove the unwanted glass component, and dried, yielding hexagonal ferrite particles. The magnetic particles obtained were analyzed by X-ray diffraction, confirming them to be hexagonal ferrite (barium ferrite).

2. Preparation of a Magnetic Recording Medium (Magnetic Tape)

2-1. Formula of Magnetic Layer Coating material

| | |
|---|---:|
| Hexagonal barium ferrite magnetic particles (shown in Table 3): | 100 parts |
| Polyurethane resin: Weight average molecular weight: 10,000 Sulfonic acid functional group content: 0.5 meq/g | 12 parts |
| Diamond fine particles (average particles diameter: 50 nm): | 2 parts |
| Carbon black (#55, made by Asahi Carbon, particle size: 0.015 μm): | 0.5 part |
| Stearic acid: | 0.5 part |
| Butyl stearate: | 2 parts |
| Methyl ethyl ketone: | 180 parts |
| Cyclohexanone: | 100 parts |

2-2. Nonmagnetic Layer Coating Material

| | |
|---|---:|
| Nonmagnetic powder α-iron oxide: Average primary particle diameter: 0.09 μm Specific surface area by BET method: 50 m²/g pH: 7 DBP oil absorption capacity: 27 g/100 g to 38 g/100 g Surface treatment agent: Al₂O₃ 8 weigh percent | 100 parts |
| Carbon black (Conductex SC-U, made by Columbia Carbon): | 25 parts |
| Vinyl chloride copolymer (MR104, made by Zeon Corp.): | 13 parts |
| Polyurethane resin (UR8200, made by Toyobo): | 5 parts |
| Phenylphosphonic acid: | 3.5 parts |
| Butyl stearate: | 1 part |
| Stearic acid: | 2 parts |
| Methyl ethyl ketone: | 205 parts |
| Cyclohexanone: | 135 parts |

2-3. Preparation of Magnetic Tape

For each of the above coating materials, the various components were kneaded in a kneader. The mixture was circulated with a pump in a horizontal sand mill the dispersion element of which had been packed to 65 percent of volume with 1.0 mm φ zirconia beads and dispersion was conducted for 120 minutes (substantially the period of retention in the dispersion element) at 2,000 rpm. To the dispersion obtained were added 6.5 parts of polyisocyanate in the case of the nonmagnetic layer coating material. Seven parts of methyl ethyl ketone were then added. The mixture was passed through a filter having an average pore diameter of 1 μm to prepare coating materials for forming the nonmagnetic layer and the magnetic layer, respectively.

The nonmagnetic layer coating material obtained was coated and dried to a thickness of 1.0 μm on a polyethylene naphthalene base 5 μm in thickness, after which sequential multilayer coating was conducted to form a magnetic layer 70 nm in thickness. Following drying, the product was treated with a seven-stage calender at a linear pressure of 300 kg/cm at a temperature of 90° C. It was then slit to ¼ inch width and subjected to a surface polishing treatment, yielding magnetic tapes (Nos. 1 to 5).

3. Evaluation of the Magnetic Particles and Magnetic Tapes

The magnetic particles and magnetic tapes were evaluated by the following methods. In the various evaluations, measurements were made in an environment of 23° C.±1° C.

(1) Magnetic Characteristics (Hc, SFD)

The coercive force Hc of the magnetic particles prepared was measured with a vibrating sample magnetometer (made by Toei-Kogyo Co., Ltd.) at a magnetic field strength of 1,194 kA/m (15 kOe). The level of magnetization relative to the magnetic field was measured using the same device and the same magnetic field strength as in the coercive force measurement. The half maximum full-width of the differential curve normalized by the coercive force He was adopted as the switching field distribution SFD.

(2) Output, Noise, SNR

The reproduction output, noise, and SNR of the magnetic tape prepared were measured after mounting a recording head (MIG, 0.15 μm gap, 1.8 T) and a reproduction-use GMR head (reproduction track width: 1 μm) on a loop tester and recording a signal at a linear recording density of 200 kfci.

(3) Signal Decay

The reproduction output of the magnetic tape prepared was measured by mounting a recording head (MG, 0.15 μm gap, 1.8 T) and a reproduction-use GMR head (reproduction track width: 1 μm) on a loop tester, recording a signal at a linear recording density of 200 kfci, repeatedly reproducing the recorded signal, and measuring the output attenuation of the recorded signal for the time from recording to reproduction. Those exhibiting values below the detection threshold (−0.5%/decade) were denoted as >−0.5%/decade, with almost no signal decay.

(4) Activation Volume Vact

A vibrating sample magnetometer (made by Toei-Kogyo Co., Ltd.) was used to measure the magnetic field sweep rate of the Hc measuring element at 3 minutes and at 30 minutes. The activation volume V was obtained from the equation relating the He based on thermal fluctuation and the activation volume given below. The anisotropic constant Ku was also calculated from the relational equation given below, and KuV/kT was calculated from the value obtained.

$$He = 2Ku/Ms\{1-[(KuT/kV)\ln(At/0.693)]^{1/2}\}$$

(In the equation, Ku: anisotropic constant; Ms: saturation magnetization; k: Boltzmann constant;
T: absolute temperature; V: activation volume; A: spin precession frequency; t: magnetic field reversal time)

(5) Quantification of Al Content

A 0.01 g quantity of the magnetic particles obtained was immersed in 10 mL of 4N—HCl solution and dissolved by heating for 3 hours at 80° C. on a hot plate. The solution was diluted. Subsequently, Fe and Al were quantified by ICP to determine the quantity of Al (atomic percent) relative to Fe.

(6) $\Delta E_{10\%}/kT$

A vibrating sample magnetometer (made by Toei-Kogyo Co., Ltd.) was used to measure the residual magnetization as follows. First, magnetization was saturated at an external field of 1,194 kA/m (15 kOe). Subsequently, a field of 7,960 A/m (100 Oe) was applied for 1 second in the opposite direction from the direction of saturation magnetization, and the amount of residual magnetization when the field was removed was measured. This reverse field was increased in increments of 7,960 A/m (100 Oe) and the reverse field when the residual magnetization at the time the field was removed reached 80% of the saturation magnetization was adopted as the Hrd (10%) for an application time of 1 second.

The Hrd (10%) values when the application time was increased to 10 seconds and 100 seconds were measured, and the $\Delta E_{10\%}/kT$ was calculated from the values.

Table 1 gives the details of the starting material formula of the magnetic particles set forth above. Table 2 gives the flow rates and crystallization temperatures of the magnetic particles during preparation, and the evaluation results for the magnetic particles prepared. Table 3 gives the details of the magnetic tapes that were prepared.

TABLE 1

| Amorphous material No. | Composition | | | | Element substituting Fe | | |
|---|---|---|---|---|---|---|---|
| | BaO mol % | $B_2O_3$ mol % | $Al_2O_3$ mol % | $Fe_2O_3$ mol % | Nb/Fe at % | Ta/Fe at % | Zn/Fe at % |
| A | 41.1 | 24.1 | 7.0 | 27.8 | 1.0 | | |
| B | 38.4 | 20.9 | 6.2 | 34.5 | | 1.0 | |
| C | 35.2 | 29.4 | — | 35.4 | | | 3.0 |
| D | 35.2 | 24.1 | 5.3 | 35.4 | 3.0 | | 7.0 |

TABLE 2

| Magnetic material No. | Amorphous material No. | Flow rate g/s | Crystallization temperature °C. | Al/Fe at % | Hc kA/m | SFD — | Vact $nm^3$ | $\Delta E_{10\%}/kT$ — |
|---|---|---|---|---|---|---|---|---|
| 1 | A | 3 | 590 | 10.8 | 95 | — | 880 | 30 |
| 2 | A | 3 | 600 | 12.0 | 191 | 0.72 | 1150 | 44 |
| 3 | A | 3 | 605 | 12.6 | 216 | 0.47 | 1260 | 46 |
| 4 | A | 3 | 645 | 13.2 | 306 | 0.35 | 1480 | 52 |
| 5 | B | 3 | 680 | 10.1 | 275 | 0.65 | 1430 | 41 |
| 6 | B | 3 | 700 | 9.9 | 303 | 0.58 | 1600 | 45 |
| 7 | C | 6 | 605 | — | 148 | 1.5 | 1200 | 35 |
| 8 | D | 6 | 700 | 15.0 | 299 | 0.95 | 1350 | 38 |

TABLE 3

| Medium No. | | Magnetic material No. | Output dB | Noise dB | SNR dB | Signal decay %/decade |
|---|---|---|---|---|---|---|
| 1 | Comp. Ex. 1 | 1 | -3.4 | -3.2 | -0.2 | -1.9 |
| 2 | Ex. 1 | 2 | -2 | -3.1 | 1.1 | -0.7 |
| 3 | Ex. 2 | 3 | -1.1 | -2.5 | 1.4 | >-0.5 |
| 4 | Ex. 3 | 4 | -0.5 | -1.3 | 0.8 | >-0.5 |
| 5 | Ex. 4 | 5 | -0.6 | -1.2 | 0.6 | -0.7 |
| 6 | Comp. Ex. 2 | 6 | 0.0 | 0.0 | 0.0 | -0.6 |
| 7 | Comp. Ex. 3 | 7 | -2.7 | -1.1 | -1.6 | -1.6 |
| 8 | Comp. Ex. 4 | 8 | -2.5 | -0.8 | -1.7 | -1.1 |

Evaluation Results

Based on the results in Tables 2 and 3, it is revealed that the use of hexagonal ferrite magnetic particles in which the activation volume and $\Delta E_{10\%}/kT$ were both controlled could make it possible to provide a magnetic recording medium exhibiting both good electromagnetic characteristics (a good SNR) and high thermal stability (little signal decay).

An aspect of the present invention is useful in the field of manufacturing magnetic recording media for use in high-density recording that are required to afford high reliability for extended periods, such as backup tapes.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. Hexagonal ferrite magnetic particles, which have:
    an activation volume ranging from 1,000 $nm^3$ to 1,300 $nm^3$, and
    $\Delta E_{10\%}/kT$, thermal stability at 10% magnetization reversal, is equal to or greater than 40;
    wherein the activation volume is an activation volume that is measured in an environment of 23° C.±1° C., and
    the hexagonal ferrite magnetic particles comprise 1.5 atomic percent to 20 atomic percent of Al relative to Fe.

2. The hexagonal ferrite magnetic particles according to claim 1, which have a coercive force ranging from 175 kA/m to 400 kA/m.

3. The hexagonal ferrite magnetic particles according to claim 1, which exhibit a switching field distribution, SFD, ranging from 0.2 to 0.8.

4. The hexagonal ferrite magnetic particles according to claim 2, which exhibit a switching field distribution, SFD, ranging from 0.2 to 0.8.

5. Magnetic recording powder, which is comprised of the hexagonal ferrite magnetic particles according to claim 1.

6. A magnetic recording medium comprising a magnetic layer comprising ferromagnetic material and binder on a nonmagnetic support, wherein
    the ferromagnetic material comprises the hexagonal ferrite magnetic particles according to claim 1.

7. A magnetic recording medium comprising a magnetic layer comprising ferromagnetic material and binder on a nonmagnetic support, wherein
    the ferromagnetic material comprises the hexagonal ferrite magnetic particles according to claim 2.

8. A magnetic recording medium comprising a magnetic layer comprising ferromagnetic material and binder on a nonmagnetic support, wherein the ferromagnetic material comprises the hexagonal ferrite magnetic particles according to claim 3.

9. A magnetic recording medium comprising a magnetic layer comprising ferromagnetic material and binder on a nonmagnetic support, wherein
the ferromagnetic material comprises the hexagonal ferrite magnetic particles according to claim 4.

10. The hexagonal ferrite magnetic particles according to claim 1, wherein the hexagonal ferrite magnetic particles are hexagonal barium ferrite magnetic particles.

* * * * *